United States Patent
Hattori et al.

(10) Patent No.: US 8,013,556 B2
(45) Date of Patent: Sep. 6, 2011

(54) MOTOR CONTROL DEVICE AND VEHICLE INCLUDING THE SAME

(75) Inventors: Hiroyuki Hattori, Okazaki (JP); Kenji Yamada, Toyota (JP); Ryoji Sato, Toyahashi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 604 days.

(21) Appl. No.: 12/085,456

(22) PCT Filed: Jun. 7, 2007

(86) PCT No.: PCT/JP2007/061961
§ 371 (c)(1),
(2), (4) Date: May 23, 2008

(87) PCT Pub. No.: WO2008/004419
PCT Pub. Date: Oct. 1, 2008

(65) Prior Publication Data
US 2009/0146589 A1 Jun. 11, 2009

(30) Foreign Application Priority Data
Jul. 7, 2006 (JP) .................. 2006-188267

(51) Int. Cl.
*H02P 21/00* (2006.01)
*H02P 27/06* (2006.01)
(52) U.S. Cl. .................. 318/433; 318/400.02
(58) Field of Classification Search .......... 318/700, 318/400.01, 400.02, 432, 433, 434, 609, 318/610; 388/906
See application file for complete search history.

(56) References Cited

U.S. PATENT DOCUMENTS

| | | | | |
|---|---|---|---|---|
| 5,198,735 A | * | 3/1993 | Taylor et al. | 318/565 |
| 5,198,739 A | * | 3/1993 | Taylor et al. | 318/661 |
| 5,366,303 A | * | 11/1994 | Barrus et al. | 400/234 |
| 5,532,571 A | * | 7/1996 | Masaki et al. | 318/809 |
| 5,656,912 A | * | 8/1997 | Yang | 318/808 |
| 5,663,621 A | * | 9/1997 | Popat | 318/480 |
| 5,886,489 A | * | 3/1999 | Rowan et al. | 318/400.01 |
| 6,097,171 A | * | 8/2000 | Branecky | 318/808 |
| 6,163,130 A | * | 12/2000 | Neko et al. | 318/806 |
| 6,362,586 B1 | * | 3/2002 | Naidu | 318/432 |
| 6,369,535 B1 | * | 4/2002 | Wang et al. | 318/400.23 |

(Continued)

FOREIGN PATENT DOCUMENTS
JP A-8-275599 10/1996
(Continued)

OTHER PUBLICATIONS

Office Action in Japanese Patent Application No. 2006-188267, dated Aug. 3, 2010.

*Primary Examiner* — Bentsu Ro
(74) *Attorney, Agent, or Firm* — Oliff & Berridge, PLC

(57) ABSTRACT

A current instruction generation unit generates a d-axis current instruction and a q-axis current instruction based on a torque instruction for an AC motor, using a map in which a current instruction capable of lowering noise (vibration and sound noise) (low-noise current instruction) generated from the AC motor is determined in advance for each torque of the AC motor. Then, a signal for driving an inverter is generated based on the generated d-axis current instruction and the q-axis current instruction.

15 Claims, 12 Drawing Sheets

U.S. PATENT DOCUMENTS 6,822,417 B2 * 11/2004 Kawaji et al. .................. 318/701
2005/0231143 A1 10/2005 Yoshinaga et al.

FOREIGN PATENT DOCUMENTS

| JP | A-9-149700 | 6/1997 |
| JP | A-10-210800 | 8/1998 |
| JP | A-10-243699 | 9/1998 |
| JP | A-10-328952 | 12/1998 |
| JP | A-2000-341991 | 12/2000 |
| JP | A-2002-215244 | 7/2002 |
| JP | A-2002-218789 | 8/2002 |
| JP | A-2004-007900 | 1/2004 |
| JP | A-2005-020800 | 1/2005 |
| JP | A-2005-117863 | 4/2005 |
| JP | A-2005-237054 | 9/2005 |
| JP | A-2005-304237 | 10/2005 |
| JP | A-2006-067718 | 3/2006 |

* cited by examiner

CURRENT PHASE (ADVANCE ANGLE)

MOTOR CONTROL DEVICE AND VEHICLE INCLUDING THE SAME

TECHNICAL FIELD

The present invention relates to a motor control device and a vehicle including the same, and more particularly to a control technique for lowering vibration and sound noise of a motor.

BACKGROUND ART

Current vector control for controlling a speed and torque of a motor to a desired value has conventionally been known. Various control methods have been proposed for current vector control, and for example, id=0 control, maximum torque control, field-weakening control, and the like have been known.

Id=0 control refers to a control method for maintaining a d-axis current at 0, and it can readily realize linear control of torque. Maximum torque control refers to a control method for maximizing generated torque with respect to the same current, and it can efficiently generate torque. Field-weakening control refers to a control method for reducing magnetic flux in a d-axis direction by feeding a negative d-axis current, and it can broaden a speed control range.

Japanese Patent Laying-Open No. 10-328952 discloses a control device for a permanent magnet synchronous motor utilizing such current vector control. The motor control device including a speed control unit and a torque control unit broadens a motor speed control range by utilizing equivalent field-weakening control and carries out speed control and torque control while independently maintaining speed control accuracy and torque control accuracy.

Among characteristics required in the motor, quietness (low vibration characteristic and low sound noise characteristic) is also important in addition to speed controllability and torque controllability. In particular, when the motor is mounted on a vehicle, quietness of the motor is highly required in order not to impair comfortability in the vehicle. In the vehicle, however, due to restricted space for mounting the motor, weight reduction or the like, measures against vibration or sound noise supported by hardware cannot sufficiently be taken in many cases.

Under the circumstances, motor control paying attention to quietness has been demanded. Japanese Patent Laying-Open No. 10-328952 above, however, does not particularly take into consideration quietness of the motor, and the control method disclosed in this publication cannot improve quietness of the motor.

In addition, in motor control capable of improving quietness of the motor, motor control stability should not be impaired and approaches for ensuring control stability are also necessary.

DISCLOSURE OF THE INVENTION

From the foregoing, the present invention was made to solve such problems, and an object of the present invention is to provide a motor control device capable of improving quietness of a motor and a vehicle including the same.

In addition, another object of the present invention is to provide a motor control device achieving improved quietness of a motor while paying attention to control stability and a vehicle including the same.

According to the present invention, a motor control device includes a current instruction generation unit and a control unit. The current instruction generation unit generates a current instruction based on a torque instruction for a motor. The control unit controls the motor based on the current instruction. The current instruction generation unit generates, based on the torque instruction, a current instruction having a current phase determined in advance for each torque of the motor so as to suppress vibration of the motor.

Preferably, the current instruction generation unit generates the current instruction so as to lower vibration of the motor, as compared with a case where the motor is controlled based on a current instruction having an optimal current phase determined so as to satisfy a prescribed condition. Here, the "prescribed condition" refers, for example, to a condition for maximizing generated torque with respect to the same current (maximum torque control).

Preferably, the current instruction generation unit generates the current instruction based on the torque instruction, using a current map in which a current phase is determined in advance for each torque of the motor.

Preferably, the motor includes a permanent magnet three-phase AC synchronous motor. The current instruction generation unit generates the current instruction so as to suppress a vibration component corresponding to a sixth-order component of a current frequency of the motor.

Preferably, the current instruction generation unit generates the current instruction so as to restrict variation in a d-axis current with respect to variation in the torque instruction.

More preferably, the current instruction generation unit generates the current instruction such that the d-axis current monotonously decreases with increase in the torque instruction.

In addition, preferably, the current instruction generation unit generates the current instruction so as to restrict variation in a q-axis current with respect to variation in the torque instruction.

More preferably, the current instruction generation unit generates the current instruction such that the q-axis current monotonously increases with increase in the torque instruction.

In addition, preferably, the current instruction generation unit generates the current instruction so as to restrict variation in a control voltage of the motor with respect to variation in the torque instruction.

More preferably, the current instruction generation unit generates the current instruction such that the control voltage monotonously increases with increase in the torque instruction.

In addition, according to the present invention, a motor control device includes a current instruction generation unit, a control unit, and a correction unit. The current instruction generation unit generates a current instruction for a motor. The control unit controls the motor based on the current instruction. The correction unit corrects the current instruction so as to suppress fluctuation in a radial direction component of magnetic force (magnetic attraction force or magnetic repulsion force) that acts between a rotor and a stator of the motor.

Preferably, the correction unit corrects the current instruction in accordance with an angle of rotation of the motor, using a correction map in which a current correction amount is determined in advance for each angle of rotation of the motor.

In addition, preferably, the motor control device further includes a sensor capable of detecting fluctuation in the radial direction component of the magnetic force that acts between the rotor and the stator of the motor. The correction unit corrects the current instruction based on a detection value from the sensor.

Preferably, the correction unit corrects the current instruction only with regard to a component of a specific order of a rotation frequency of the motor.

More preferably, the motor includes a permanent magnet three-phase AC synchronous motor. The component of the specific order is a sixth-order component.

In addition, according to the present invention, a vehicle includes a motor and any motor control device controlling the motor described above.

As described above, according to the present invention, the current instruction generation unit generates, based on the torque instruction, a current instruction having a current phase determined in advance for each torque of the motor so as to suppress vibration of the motor, and the control unit controls the motor based on the current instruction. Therefore, quietness of the motor can be improved, without increase in size and weight of the motor brought about by measures against vibration or sound noise supported by hardware.

In addition, in the present invention, as the current instruction generation unit generates the current instruction so as to restrict variation in the d-axis current or the q-axis current with respect to variation in the torque instruction, sudden change in the current instruction with respect to variation in the torque instruction is not likely. Therefore, according to the present invention, motor control stability can be ensured.

Moreover, in the present invention, as the current instruction generation unit generates the current instruction so as to restrict variation in the control voltage of the motor with respect to variation in the torque instruction, sudden change in the control voltage of the motor with respect to variation in the torque instruction is not likely. Therefore, according to the present invention, where a control mode of the motor (a PWM (Pulse Width Modulation) control mode, an overmodulation control mode, a rectangular wave control mode, and the like) is switched depending on a control voltage, unstable control of the motor due to frequent switching between the control modes can be avoided.

Further, though fluctuation in the radial direction component of the magnetic force that acts between the rotor and the stator of the motor considerably affects vibration and sound noise of the motor, according to the present invention, the correction unit corrects the current instruction so as to suppress fluctuation in the radial direction component of the magnetic force. Therefore, quietness of the motor can effectively be improved. In addition, increase in size and weight of the motor brought about by measures against vibration or sound noise supported by hardware is not caused.

BEST MODES FOR CARRYING OUT THE INVENTION

Figure 1:
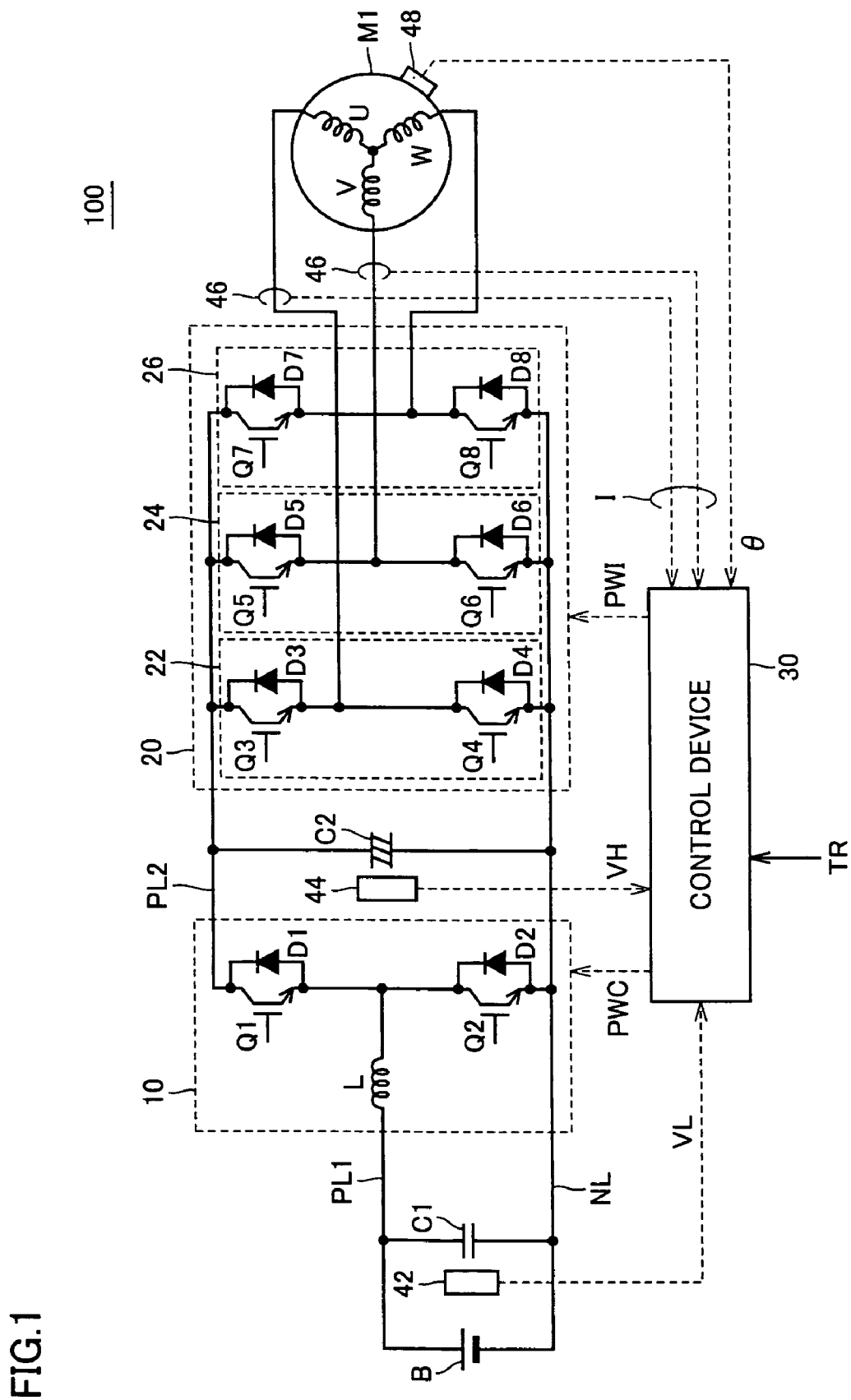
FIG. 1 is a circuit diagram of a motor drive apparatus including a motor control device according to the present invention.

An embodiment of the present invention will be described hereinafter in detail with reference to the drawings. The same or corresponding elements have the same reference characters allotted, and description thereof will not be repeated.

First Embodiment

FIG. 1 is a circuit diagram of a motor drive apparatus including a motor control device according to the present invention. Referring to FIG. 1, a motor drive apparatus 100 includes a DC power supply B, a boost converter 10, an inverter 20, a control device 30, capacitors C1, C2, positive electrode lines PL1, PL2, a negative electrode line NL, voltage sensors 42, 44, a current sensor 46, and a rotation angle sensor 48.

Motor drive apparatus 100 is mounted on a vehicle such as an electric vehicle, a hybrid vehicle, a fuel cell vehicle, and the like. An AC motor M1 is mechanically linked to drive wheels (not shown) and generates torque for driving the vehicle. Alternatively, AC motor M1 may mechanically be linked to an engine (not shown) and may be incorporated in a hybrid vehicle as a generator that generates electric power using motive power of the engine and a motor starting the engine.

Boost converter 10 includes a reactor L, npn-type transistors Q1, Q2, and diodes D1, D2. Npn-type transistors Q1, Q2 are connected in series between positive electrode line PL2 and negative electrode line NL. Reactor L has one end connected to positive electrode line PL1 and the other end connected to a connection node of npn-type transistors Q1, Q2. Diodes D1, D2 are connected in anti-parallel to npn-type transistors Q1, Q2, respectively.

Inverter 20 includes a U-phase arm 22, a V-phase arm 24 and a W-phase arm 26. U-phase arm 22, V-phase arm 24 and W-phase arm 26 are connected in parallel between positive electrode line PL2 and negative electrode line NL. U-phase arm 22 includes npn-type transistors Q3, Q4 connected in series and diodes D3, D4 connected in anti-parallel to npn-type transistors Q3, Q4. V-phase arm 24 includes npn-type transistors Q5, Q6 connected in series and diodes D5, D6 connected in anti-parallel to npn-type transistors Q5, Q6. W-phase arm 26 includes npn-type transistors Q7, Q8 connected in series and diodes D7, D8 connected in anti-parallel to npn-type transistors Q7, Q8.

An intermediate point of U-phase arm 22 is connected to a U-phase coil of AC motor M1, and similarly, an intermediate point of V-phase arm 24 and an intermediate point of W-phase arm 26 are connected to a V-phase coil and a W-phase coil of AC motor M1, respectively. It is noted that the other ends of coils of respective phases of AC motor M1 are connected to one another to form a neutral point.

For example, an IGBT (Insulated Gate Bipolar Transistor) may be employed as npn-type transistors Q1 to Q8 above. Alternatively, a power switching element such as a power MOSFET (Metal Oxide Semiconductor Field-Effect Transistor) may be employed instead of the npn-type transistor.

DC power supply B is implemented by a secondary battery such as a nickel-metal hydride battery or a lithium ion battery. DC power supply B supplies electric power to boost converter 10 through positive electrode line PL1 and negative electrode line NL, and during regeneration, it is charged by boost converter 10. It is noted that a large-capacity capacitor may be employed as DC power supply B.

Capacitor C1 is connected between positive electrode line PL1 and negative electrode line NL and smoothes voltage fluctuation between positive electrode line PL1 and negative electrode line NL. Voltage sensor 42 detects a voltage VL across opposing ends of capacitor C1 and outputs detected voltage VL to control device 30.

Boost converter 10 boosts a voltage supplied from DC power supply B by using reactor L based on a signal PWC from control device 30. More specifically, boost converter 10 boosts a voltage from DC power supply B by accumulating a current that flows when npn-type transistor Q2 is turned on in reactor L as magnetic field energy, and outputting the accumulated energy to positive electrode line PL2 through diode D1 in synchronization with timing of turn-off of npn-type transistor Q2.

Capacitor C2 is connected between positive electrode line PL2 and negative electrode line NL and smoothes voltage fluctuation between positive electrode line PL2 and negative electrode line NL. Voltage sensor 44 detects a voltage VH across opposing ends of capacitor C2 and outputs detected voltage VH to control device 30.

Inverter 20 converts a DC voltage supplied from boost converter 10 to a three-phase AC voltage based on a signal PWI from control device 30, and outputs the resultant three-phase AC voltage to AC motor M1. In addition, during regenerative braking of the vehicle, inverter 20 converts a three-phase AC voltage generated by AC motor M1 to a DC voltage based on signal PWI, and outputs the resultant DC voltage to positive electrode line PL2.

Current sensor 46 detects a motor current I that flows in AC motor M1 and outputs detected motor current I to control device 30. Rotation angle sensor 48 detects a rotation angle θ of a rotor of AC motor M1 and outputs detected rotation angle θ to control device 30.

Control device 30 generates signal PWC for driving boost converter 10 and signal PWI for driving inverter 20 based on a torque instruction TR received from a not-shown external ECU (Electronic Control Unit), voltages VL, VH from voltage sensors 42, 44, motor current I from current sensor 46, and rotation angle θ from rotation angle sensor 48, and outputs generated signal PWC and signal PWI to boost converter 10 and inverter 20 respectively. Here, torque instruction TR is calculated by the external ECU based on an accelerator pedal position and a brake pedal position, a running state of the vehicle, or the like.

Figure 2:
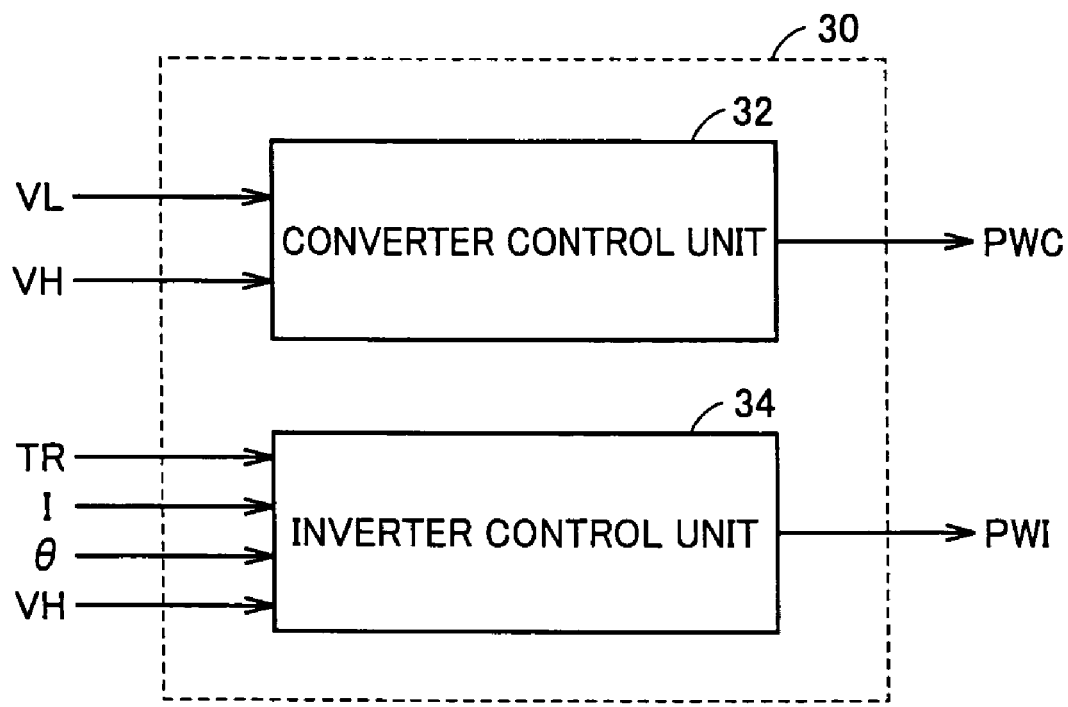
FIG. 2 is a functional block diagram of the control device shown in FIG. 1.

FIG. 2 is a functional block diagram of control device 30 shown in FIG. 1. Referring to FIG. 2, control device 30 includes a converter control unit 32 and an inverter control unit 34. Converter control unit 32 generates signal PWC for turning on/off npn-type transistors Q1, Q2 of boost converter 10 based on voltage VL, VH, and outputs generated signal PWC to boost converter 10.

Inverter control unit 34 generates signal PWI for turning on/off npn-type transistors Q3 to Q8 of inverter 20 based on torque instruction TR for AC motor M1, motor current I and rotation angle θ as well as on voltage VH, and outputs generated signal PWI to inverter 20.

Figure 3:
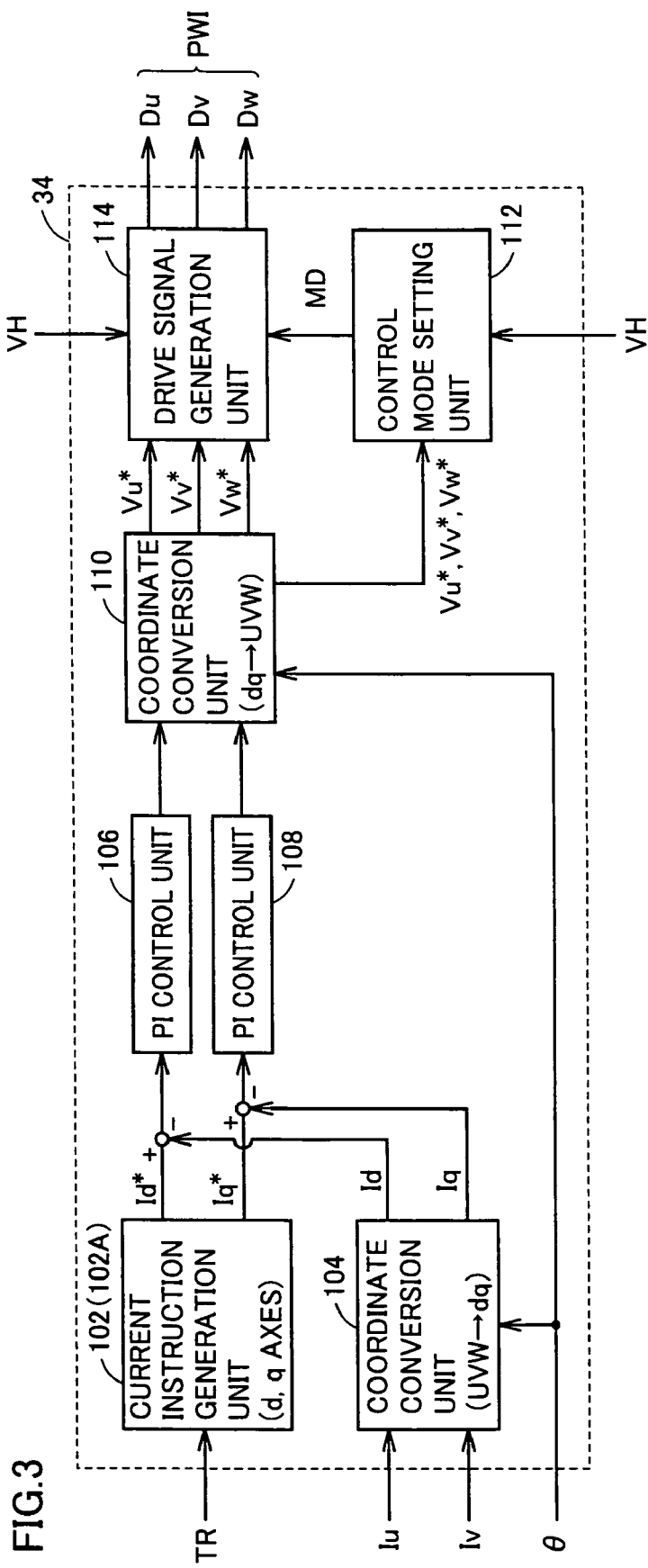
FIG. 3 is a detailed functional block diagram of an inverter control unit shown in FIG. 2.

FIG. 3 is a detailed functional block diagram of inverter control unit 34 shown in FIG. 2. Referring to FIG. 3, inverter control unit 34 includes a current instruction generation unit 102, coordinate conversion units 104, 110, PI control units 106, 108, a control mode setting unit 112, and a drive signal generation unit 114.

Current instruction generation unit 102 generates a d-axis current instruction Id* and a q-axis current instruction Iq* based on torque instruction TR for AC motor M1, using a map in which a current instruction capable of lowering noise (vibration and sound noise) (hereinafter, also referred to as a "low-noise current instruction," current control based on the low-noise current instruction being also referred to as "low-noise control") generated from AC motor M1 is determined in advance for each torque of AC motor M1. A method of determining d-axis current instruction Id* and q-axis current instruction Iq* will be described in detail later.

Coordinate conversion unit 104 converts motor current I detected by current sensor 46 to a d-axis current Id and a q-axis current Iq using rotation angle θ from rotation angle sensor 48. PI control unit 106 receives difference between d-axis current instruction Id* from current instruction generation unit 102 and d-axis current Id from coordinate conversion unit 104 and performs a proportional integral operation using the difference as the input, and outputs the result of operation to coordinate conversion unit 110. PI control unit 108 receives difference between q-axis current instruction Iq* from current instruction generation unit 102 and q-axis current Iq from coordinate conversion unit 104 and performs a proportional integral operation using the difference as the input, and outputs the result of operation to coordinate conversion unit 110.

Coordinate conversion unit 110 converts voltage instructions on d and q axes received from respective PI control units 106 and 108 to a U-phase voltage instruction Vu*, a V-phase voltage instruction Vv*, and a W-phase voltage instruction Vw* by using rotation angle θ from rotation angle sensor 48, and outputs resultant voltage instructions Vu*, Vv* and Vw* to drive signal generation unit 114 and control mode setting unit 112.

Control mode setting unit 112 calculates a modulation factor indicating a ratio of voltage instructions Vu*, Vv* and Vw* with respect to voltage VH. Then, control mode setting unit 112 sets a control mode of AC motor M1 in inverter 20 based on a result of calculation of the modulation factor, and outputs a signal MD indicating the set control mode to drive signal generation unit 114.

It is noted that the control mode of AC motor M1 includes a PWM control mode, an overmodulation control mode, and a rectangular wave control mode. These control modes are different from each other in a basic frequency for turning on/off npn-type transistors Q3 to Q8 in inverter 20 (referred to as "carrier frequency"). Specifically, the PWM control mode is highest in the carrier frequency, the overmodulation control mode is second highest in the carrier frequency, and the rectangular wave control mode is lowest in the carrier frequency.

When the modulation factor is low, control mode setting unit 112 sets the control mode to the PWM control mode. In addition, when the modulation factor is increased, control mode setting unit 112 sets the control mode to the overmodulation control mode. Moreover, when the modulation factor is further increased, control mode setting unit 112 sets the control mode to the rectangular wave control mode.

Drive signal generation unit 114 generates drive signals Du, Dv and Dw based on voltage instructions Vu*, Vv*, and Vw* received from coordinate conversion unit 110, based on the control mode indicated by signal MD. More specifically, drive signal generation unit 114 generates drive signals Du, Dv and Dw for actually turning on/off each of npn-type transistors Q3 to Q8 in inverter 20 based on voltage instructions Vu*, Vv* and Vw* and voltage VH, and outputs generated drive signals Du, Dv and Dw to inverter 20 as signal PWI.

Thus, switching of each of npn-type transistors Q3 to Q8 in inverter 20 is controlled in accordance with drive signals Du, Dv and Dw, so that a current fed to the coil of each phase in AC motor M1 is controlled. Motor current I is thus controlled and motor torque in accordance with torque instruction TR is generated.

The method of determining d-axis current instruction Id* and q-axis current instruction Iq* in current instruction generation unit 102 will now be described.

Figure 4:
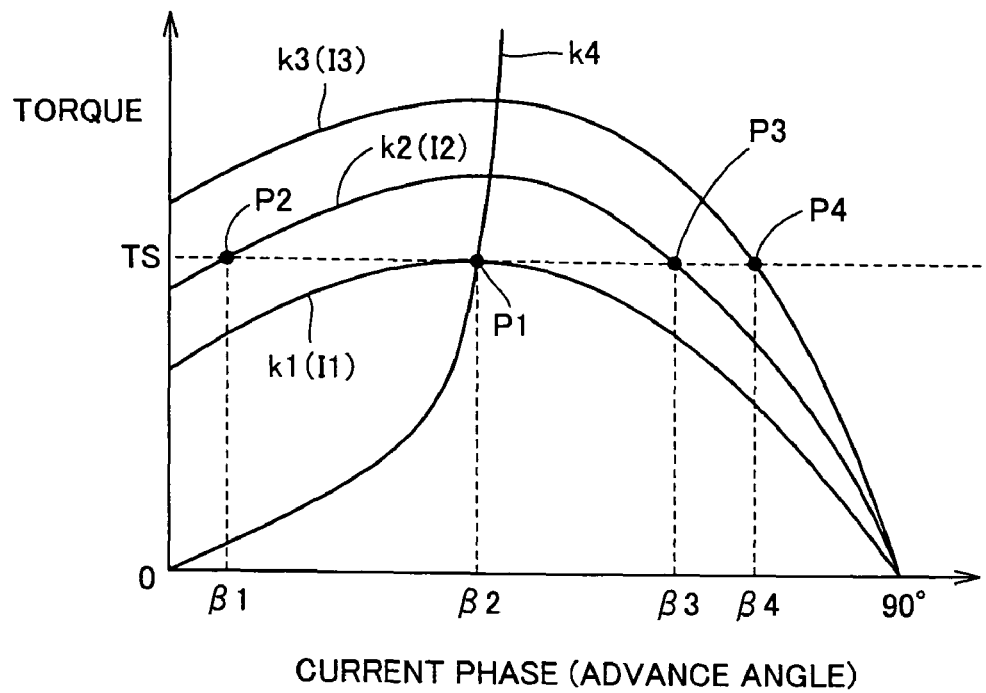
FIG. 4 illustrates relation between a current phase and torque.

FIG. 4 illustrates relation between a current phase and torque. Referring to FIG. 4, the abscissa represents a phase (advance angle) of a current fed to AC motor M1, while the ordinate represents torque of AC motor M1. Curves k1 to k3 represent variations in the torque when the currents fed to AC motor M1 are set to I1 to I3 respectively, and relation among currents I1 to I3 in magnitude is I1<I2<I3.

A curve k4 represents a maximum torque curve, and represents locus of the maximum torque when the current fed to AC motor M1 is varied. For example, when a current phase (advance angle) is set to β2 while the current fed to AC motor M1 is set to I1, maximum torque TS at current I1 is obtained (point P1). Such control for determining the current phase such that the generated torque is maximized with respect to the same current is generally referred to as "maximum torque control."

Meanwhile, conditions of magnitude and phase of the current for generating torque TS also exist other than current I1 and current phase β2 (point P1). Specifically, as shown in the drawing, identical torque TS can be generated also when the current is set to I2 and the current phase is set to β1 (point P2), when the current is set to I2 and the current phase is set to β3 (point P3), when the current is set to I3 and the current phase is set to β4 (point P4), and the like.

Figure 5:
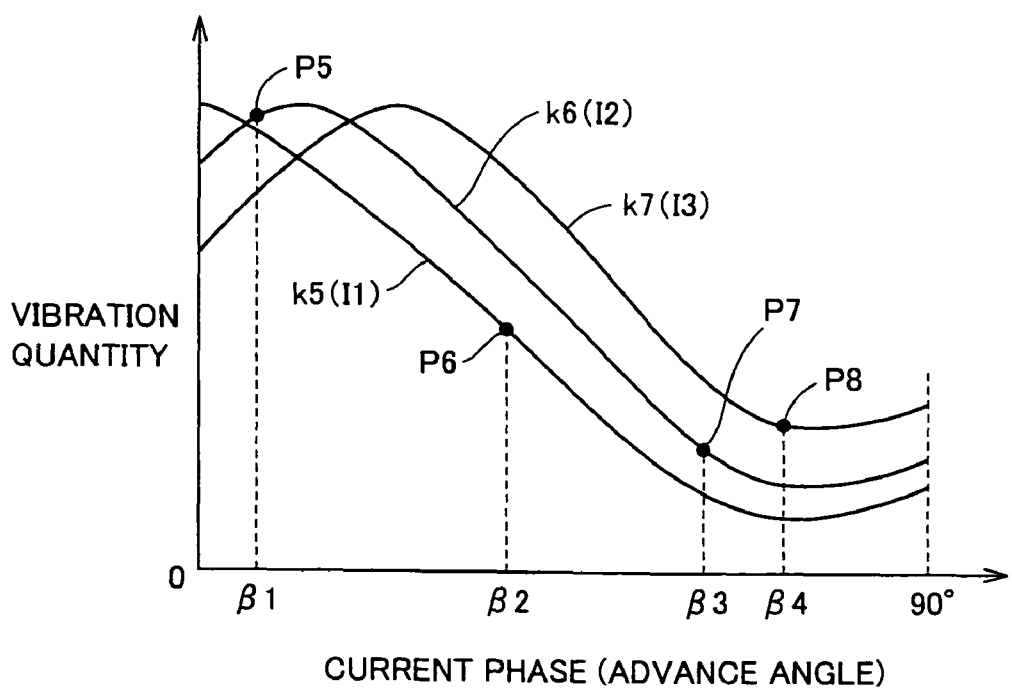
FIG. 5 illustrates relation between a current phase and a vibration quantity.

FIG. 5 illustrates relation between a current phase and a vibration quantity. Referring to FIG. 5, the abscissa represents a phase (advance angle) of a current fed to AC motor M1, while the ordinate represents a vibration quantity of AC motor M1. The vibration quantity should only indicate a quantity of state capable of representing magnitude of vibration of AC motor M1. For example, as AC motor M1 is a three-phase motor, an electric sixth-order component dominant over vibration or sound noise generated by AC motor M1 (a vibration component or a sound noise component corresponding to a sixth-order component of a current frequency of AC motor M1) can serve as the vibration quantity.

Curves k5 to k7 represent variations in the vibration quantities when the currents fed to AC motor M1 are set to I1 to I3 (I1<I2<I3), respectively. The vibration quantity of AC motor M1 significantly depends on magnetic force (magnetic attraction force or magnetic repulsion force) that acts between the rotor and the stator, and as can be seen from comparison with FIG. 4, the vibration quantity of AC motor M1 does not correspond to variation in the torque.

Here, turning to the vibration quantity when AC motor M1 generates torque TS shown in FIG. 4, the vibration quantity when the current is set to I2 and the current phase is set to β1 (corresponding to point P2 in FIG. 4) is shown with a point P5, and the vibration quantity when the current is set to I1 and the current phase is set to β2 (corresponding to point P1 in FIG. 4) is shown with a point P6. In addition, the vibration quantity when the current is set to I2 and the current phase is set to β3 (corresponding to point P3 in FIG. 4) is shown with a point P7, and the vibration quantity when the current is set to I3 and the current phase is set to β4 (corresponding to point P4 in FIG. 4) is shown with a point P8.

Therefore, where AC motor M1 is caused to generate torque TS, vibration of AC motor M1 can be lowest when the current is set to I2 and the current phase is set to β3 (point P7), considering control of AC motor M1 in terms of the vibration quantity. Thus, in the present first embodiment, the current and the phase minimizing the vibration quantity of AC motor M1 are found in advance through experiments or calculation for each torque, and the current instruction (low-noise current instruction) is generated based on provided torque instruction TR.

Figure 6:
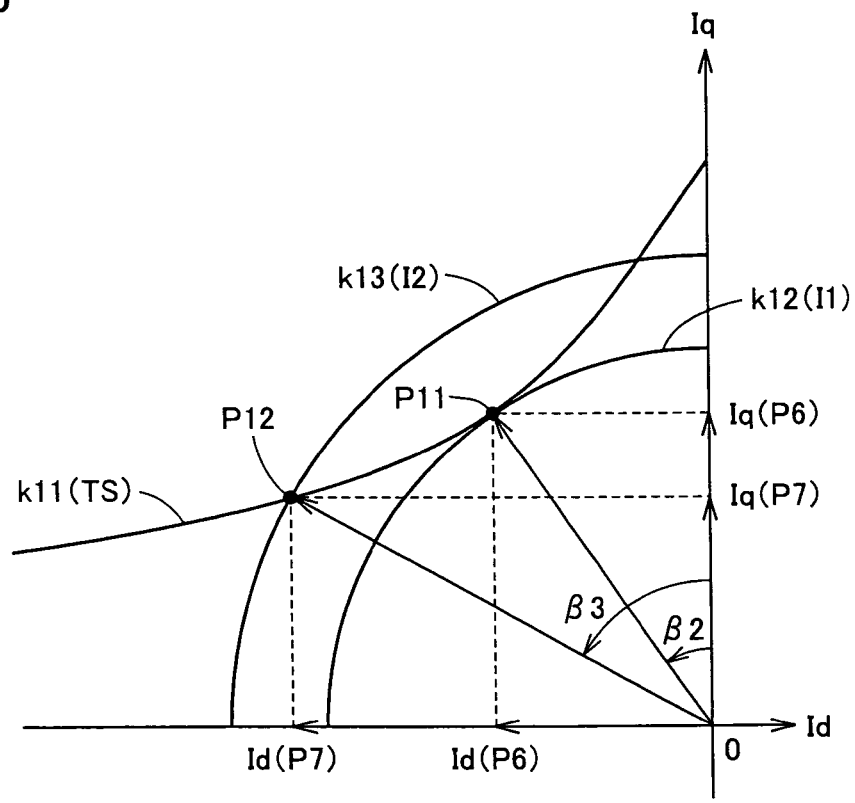
FIG. 6 illustrates a current vector in low-noise control and maximum torque control.

FIG. 6 illustrates a current vector in low-noise control and maximum torque control. Referring to FIG. 6, the abscissa represents a d-axis current, while the ordinate represents a q-axis current. A curve k11 represents a constant torque curve for generating torque TS shown in FIG. 4. Curves k12 and k13 represent constant current curves corresponding to currents I1 and I2 shown in FIG. 4, respectively.

A point P11 is a point of tangency of curve k11 and curve k12, and a vector extending from the origin to point P11 represents a current vector in maximum torque control. Specifically, the d-axis current and the q-axis current when the current is set to I1 and the current phase is set to β2 are Id (P6) and Iq (P6), respectively ("P6" in parentheses indicates correspondence with point P6 in FIG. 5).

On the other hand, a point P12 is a point of tangency of curve k11 and curve k13, and a vector extending from the origin to point P12 represents a current vector in low-noise control that minimizes vibration of AC motor M1 when AC motor M1 is caused to generate torque TS. Specifically, the d-axis current and the q-axis current when the current is set to I2 and the current phase is set to β3 are Id (P7) and Iq (P7), respectively ("P7" in parentheses indicates correspondence with point P7 in FIG. 5).

In the first embodiment, actually, a map is prepared in advance by finding a current vector (d-axis current and q-axis current) minimizing the vibration quantity of AC motor M1 in advance through experiments or calculation for each torque, and current instruction generation unit 102 generates d-axis current instruction Id* and q-axis current instruction Iq* using the map, based on provided torque instruction TR.

Figure 7:
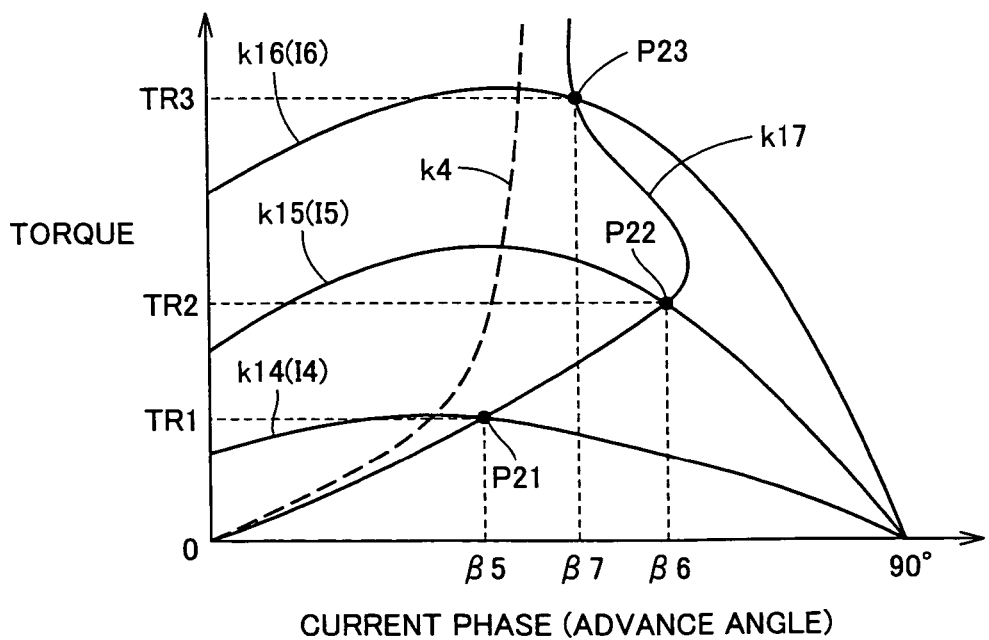
FIG. 7 illustrates relation between a current phase and torque.

FIG. 7 illustrates relation between a current phase and torque. Referring to FIG. 7, curves k14 to k16 represent variations in the torque when the currents fed to AC motor M1 are set to I4 to I6 respectively, and relation among currents I4 to I6 in magnitude is I4<I5<I6.

A curve k17 represents locus of the current phase minimizing the vibration quantity of AC motor M1. Specifically, where the torque instruction of AC motor M1 is set to TR1, when current I4 is fed to AC motor M1 with the current phase being set to β5 (point P21), vibration of AC motor M1 is minimized. Alternatively, where the torque instruction is set to TR2, when current I5 is fed to AC motor M1 with the current phase being set to β6, vibration of AC motor M1 is minimized (point P22), and where the torque instruction is set to TR3, when current I6 is fed to AC motor M1 with the current phase being set to β7, vibration of AC motor M1 is minimized (point P23). Namely, curve k17 represents locus of the current phase in low-noise control.

Though the current phase in low-noise control is advanced relative to the current phase in maximum torque control shown with curve k4 in FIG. 7, depending on relation between the current phase and the vibration quantity, the current phase in low-noise control may be delayed relative to the current phase in maximum torque control.

Figure 8:
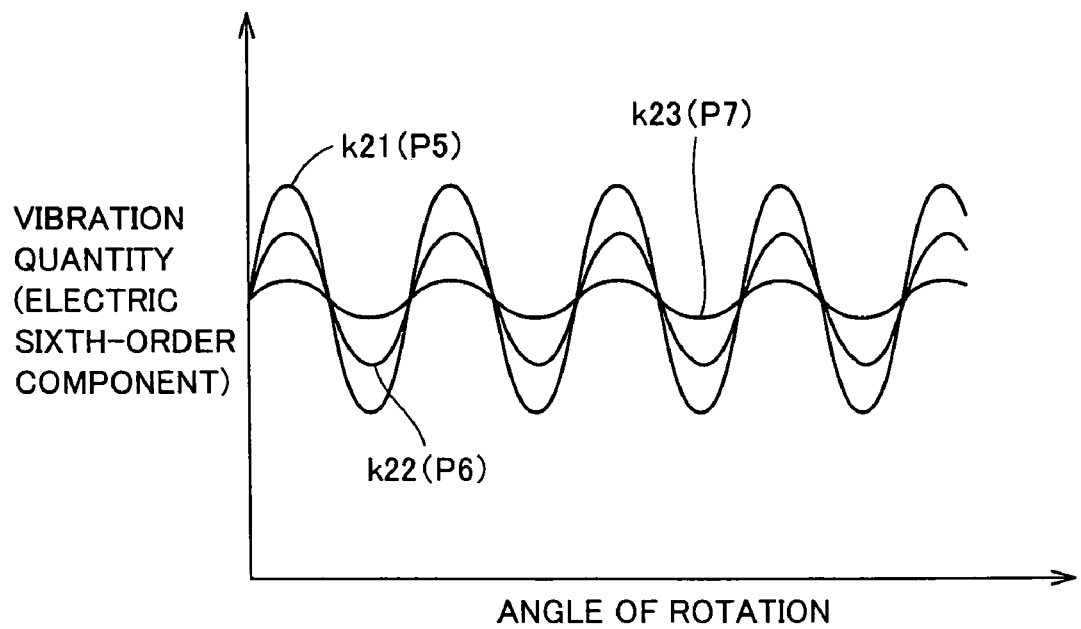
FIG. 8 illustrates relation between an angle of rotation of a motor and a vibration quantity (electric sixth-order component).

FIG. 8 illustrates relation between an angle of rotation of the motor and a vibration quantity (electric sixth-order component). Referring to FIG. 8, the abscissa represents an angle of rotation of the rotor of AC motor M1, while the ordinate represents the vibration quantity of AC motor M1. Each of curves k21 to k23 represents an electric sixth-order component of a vibration waveform of AC motor M1 under each current condition when AC motor M1 generates torque TS.

Specifically, curve k21 represents a vibration waveform when current I2 is fed to AC motor M1 while the current phase is set to β1 in order to generate torque TS (corresponding to point P5 in FIG. 5), curve k22 represents a vibration waveform when current I1 is fed to AC motor M1 while the current phase is set to β2 in order to generate torque TS (corresponding to point P6 in FIG. 5), and curve k23 represents a vibration waveform when current I2 is fed to AC motor M1 while the current phase is set to β3 in order to generate torque TS (corresponding to point P7 in FIG. 5).

As shown in the drawing, curve k23 corresponding to an example where AC motor M1 is under low-noise control in the present first embodiment is smaller in amplitude than curve k22 corresponding to an example where AC motor M1 is under maximum torque control, and the vibration quantity of AC motor M1 can be decreased by adopting low-noise control.

Figure 9:
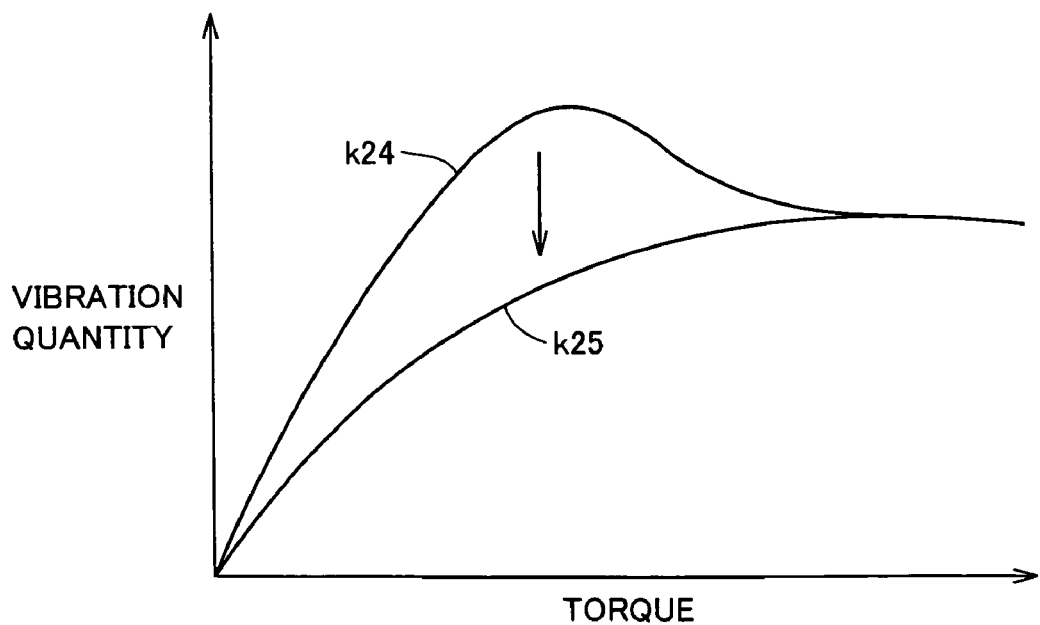
FIG. 9 illustrates relation between torque and a vibration quantity.

FIG. 9 illustrates relation between the torque and the vibration quantity. Referring to FIG. 9, a curve k24 represents variation in the vibration quantity when AC motor M1 is under maximum torque control, while a curve k25 represents variation in the vibration quantity when AC motor M1 is under low-noise control in the present first embodiment.

Figure 10:
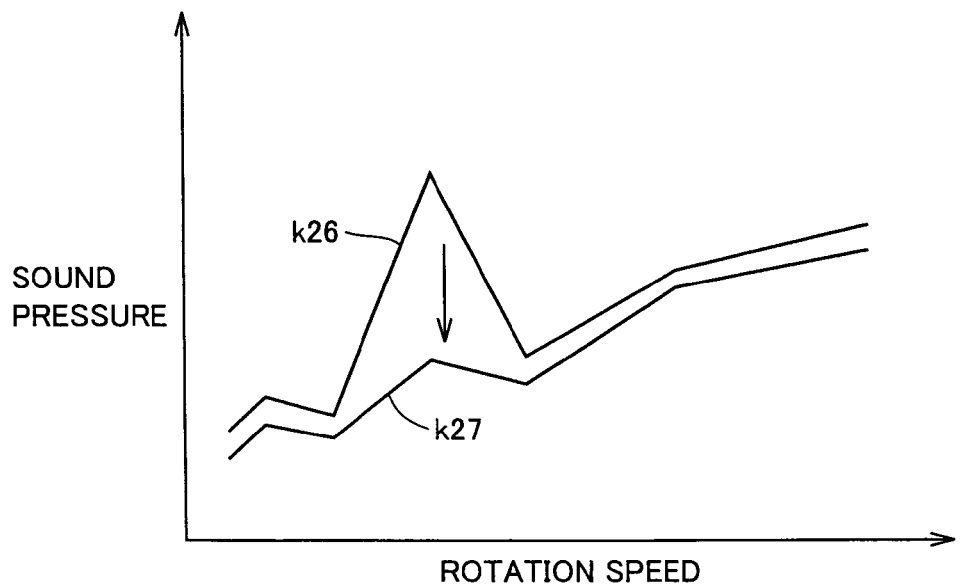
FIG. 10 illustrates relation between a rotation speed of the motor and a sound pressure.

In addition, FIG. 10 illustrates relation between a rotation speed of the motor and a sound pressure. It is noted that a sound pressure corresponds to a sound noise level of AC motor M1. Referring to FIG. 10, a curve k26 represents variation in the sound pressure when AC motor M1 is under maximum torque control, while a curve k27 represents variation in the sound pressure when AC motor M1 is under low-noise control in the present first embodiment.

As shown in FIGS. 9 and 10, by subjecting AC motor M1 to low-noise control according to the present first embodiment, the vibration quantity and the sound pressure of AC motor M1 are significantly lower than in an example where AC motor M1 is subjected to conventional maximum torque control.

As described above, according to the present first embodiment, current instruction generation unit 102 generates the low-noise current instruction based on torque instruction TR and AC motor M1 is controlled based on the low-noise current instruction, so that quietness of AC motor M1 can be improved without increase in size and weight of the motor brought about by measures against vibration or sound noise supported by hardware.

Second Embodiment

Referring again to FIG. 7 where the current phase in low-noise control is shown with curve k17, variation in the current phase with respect to variation in the torque instruction is greater in low-noise control than in maximum torque control shown with curve k4. Here, as shown in FIG. 3, the current fed to AC motor M1 is subjected to PI control (feedback control) based on the difference between the current instruction and an actual current for each d-axis current and q-axis current. Therefore, when the current phase suddenly changes, d-axis current instruction Id* and q-axis current instruction Iq* suddenly change and control stability may be impaired. In the present second embodiment, measures for ensuring control stability while lowering noise of AC motor M1 are taken.

Referring again to FIG. 3, inverter control unit 34 in the present second embodiment includes a current instruction generation unit 102A instead of current instruction generation unit 102 in the configuration of inverter control unit 34 in the first embodiment.

Current instruction generation unit 102A generates d-axis current instruction Id* and q-axis current instruction Iq* based on torque instruction TR for AC motor M1, using a map in which a d-axis current instruction obtained by modifying the d-axis current instruction for low-noise control such that it monotonously decreases with the increase in the torque instruction and a q-axis current instruction determined based on that d-axis current instruction are determined in advance for each torque.

The configuration of inverter control unit 34 in the second embodiment is otherwise the same as in the first embodiment. In addition, the overall configuration of a motor drive apparatus in the present second embodiment is the same as that of motor drive apparatus 100 shown in FIG. 1.

Figure 11:
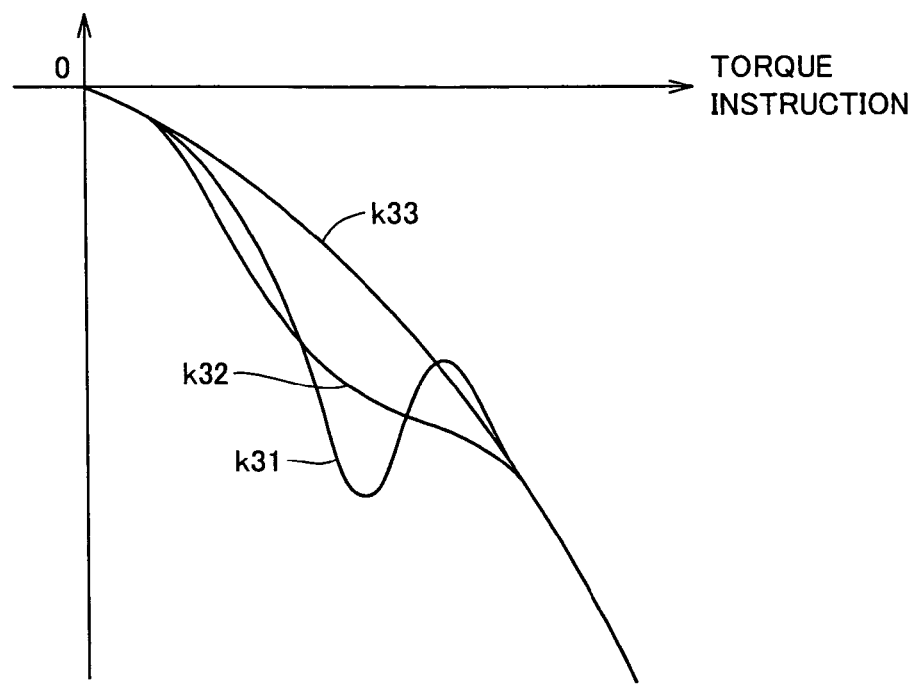
FIG. 11 illustrates relation between a torque instruction and a d-axis current instruction.

FIG. 11 illustrates relation between torque instruction TR and d-axis current instruction Id*. Referring to FIG. 11, a curve k31 represents d-axis current instruction Id* for low-noise control in the first embodiment, and a curve k32 represents d-axis current instruction Id* in the present second embodiment. In addition, a curve k33 represents d-axis current instruction Id* for maximum torque control.

D-axis current instruction Id* for low-noise control shown with curve k31 largely fluctuates with respect to variation in torque instruction TR and the fluctuation is not monotonous. In the present second embodiment, d-axis current instruction Id* is determined based on curve k32 obtained by modifying curve k31 such that d-axis current instruction Id* monotonously decreases with the increase in torque instruction TR, with curve k31 still serving as the basis. Thus, variation in the current instruction with respect to variation in the torque instruction is suppressed and control stability is ensured.

Curve k32 may be determined in such a manner that compromise is found between curve k31 representing the d-axis current instruction for low-noise control and curve k33 representing the d-axis current instruction for maximum torque control. Thus, significant lowering in efficiency can be prevented, while achieving lower noise of AC motor M1. Alternatively, curve k32 may be determined by combining the d-axis current instruction in control using other control methods (power factor 1 control and the like) with the d-axis current instruction for low-noise control.

As described above, according to the present second embodiment, as AC motor M1 is controlled by using d-axis current instruction Id* modified such that it monotonously decreases with the increase in torque instruction TR with the d-axis current instruction for low-noise control still serving as the basis, control stability can be ensured while achieving lower noise of AC motor M1.

In addition, by generating d-axis current instruction Id* by finding compromise between the d-axis current instruction for low-noise control and the d-axis current instruction for maximum torque control, significant lowering in efficiency can be prevented.

[First Variation of Second Embodiment]

In the embodiment above, the d-axis current instruction for low-noise control is modified such that it monotonously decreases with the increase in the torque instruction, however, the q-axis current instruction for low-noise control may be modified such that it monotonously increases with the increase in the torque instruction.

Specifically, current instruction generation unit 102A in a first variation of the present second embodiment generates d-axis current instruction Id* and q-axis current instruction Iq* based on torque instruction TR for AC motor M1, using a map in which a q-axis current instruction obtained by modifying the q-axis current instruction for low-noise control such that it monotonously increases with the increase in the torque instruction and a d-axis current instruction determined based on that q-axis current instruction are determined in advance for each torque.

Figure 12:
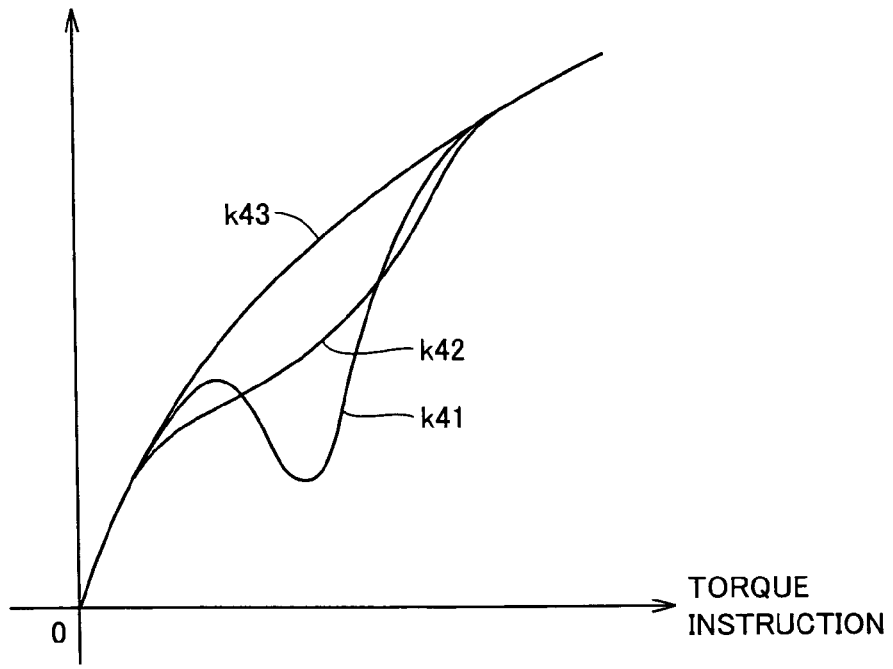
FIG. 12 illustrates relation between a torque instruction and a q-axis current instruction.

FIG. 12 illustrates relation between torque instruction TR and q-axis current instruction Iq*. Referring to FIG. 12, a curve k41 represents q-axis current instruction Iq* for low-noise control in the first embodiment, and a curve k42 represents q-axis current instruction Iq* in the first variation of the present second embodiment. In addition, a curve k43 represents q-axis current instruction Iq* for maximum torque control.

Q-axis current instruction Iq* for low-noise control shown with curve k41 largely fluctuates with respect to variation in torque instruction TR and the fluctuation is not monotonous. In the first variation of the present second embodiment, q-axis current instruction Iq* is determined based on curve k42 obtained by modifying curve k41 such that q-axis current instruction Iq* monotonously increases with the increase in torque instruction TR, with curve k41 still serving as the basis. Thus, variation in the current instruction with respect to variation in the torque instruction is suppressed and control stability is ensured.

Curve k42 may be determined in such a manner that compromise is found between curve k41 representing the q-axis current instruction for low-noise control and curve k43 representing the q-axis current instruction for maximum torque control. Thus, significant lowering in efficiency can be prevented, while achieving lower noise of AC motor M1. Alternatively, curve k42 may be determined by combining the q-axis current instruction in control using other control methods and the q-axis current instruction for low-noise control.

As described above, an effect the same as in the second embodiment can be obtained also in the first variation of the present second embodiment.

[Second Variation of Second Embodiment]

When d-axis current instruction Id* and q-axis current instruction Iq* are generated under low-noise control in the first embodiment and AC motor M1 is controlled based on that generated current instruction, a motor voltage (inverter output voltage) may suddenly change with respect to variation in torque instruction TR, or variation in the motor voltage with respect to variation in torque instruction TR may not be monotonous.

Here, as the control mode of AC motor M1 varies in accordance with the modulation factor in inverter 20 as described above, under low-noise control in the first embodiment, lowering in control stability or increase in control load may also be caused due to frequent switching between the control modes. In a second variation of the second embodiment, d-axis current instruction Id* and q-axis current instruction Iq* are generated such that the motor voltage monotonously increases with the increase in torque instruction TR, with low-noise control stilling serving as the basis.

Figure 13:
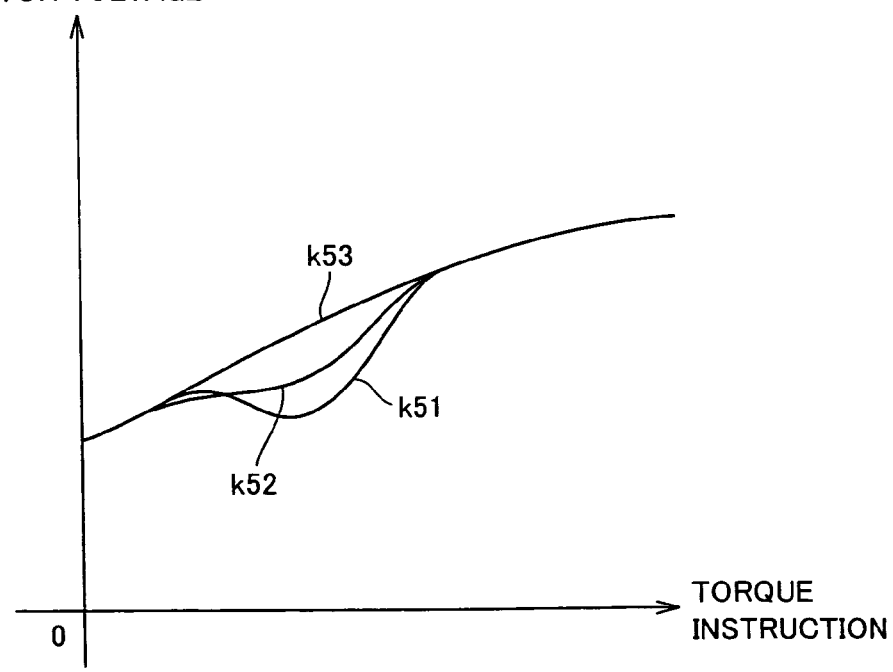
FIG. 13 illustrates relation between a torque instruction and a motor voltage.

FIG. 13 illustrates relation between torque instruction TR and the motor voltage. Referring to FIG. 13, a curve k51 represents a motor voltage in low-noise control in the first embodiment, and a curve k52 represents the motor voltage in the second variation of the present second embodiment. In addition, a curve k53 represents the motor voltage in maximum torque control.

The motor voltage in low-noise control shown with curve k51 largely fluctuates with respect to variation in torque instruction TR and the fluctuation is not monotonous. In the second variation of the present second embodiment, d-axis current instruction Id* and q-axis current instruction Iq* are generated such that the motor voltage varies in accordance with curve k52 obtained by modifying curve k51 such that the motor voltage monotonously increases with the increase in torque instruction TR, with curve k51 still serving as the basis.

Specifically, a motor voltage V is determined using curve k52 based on torque instruction TR, and d-axis current instruction Id* and q-axis current instruction Iq* can be calculated to satisfy the following voltage expressions, based on determined motor voltage V.

$$Vd=(Id^*)\times R-\omega Lq\times(Iq^*) \quad (1)$$

$$Vq=(Iq^*)\times R+\omega Ld\times(Id^*)+\omega\times\phi \quad (2)$$

$$V=\sqrt{(Vd^2+Vq^2)}/\sqrt{3} \quad (3)$$

In the expressions, R represents a resistance of an armature winding of AC motor M1, and ω represents an electrical angular velocity. In addition, Lq and Ld represent a q-axis inductance and a d-axis inductance respectively, and φ represents a flux linkage of an armature.

Then, a map is prepared by finding d-axis current instruction Id* and q-axis current instruction Iq* for each torque instruction TR using the method above, and using this map, current instruction generation unit 102A generates d-axis current instruction Id* and q-axis current instruction Iq* based on provided torque instruction TR.

Curve k52 may be determined in such a manner that compromise is found between curve k51 representing the motor voltage in low-noise control and curve k53 representing the motor voltage in maximum torque control. Thus, significant lowering in efficiency can be prevented, while achieving lower noise of AC motor M1. Alternatively, curve k52 may be determined by combining a motor voltage curve in control using other control methods and a motor voltage curve in low-noise control.

Figure 14:
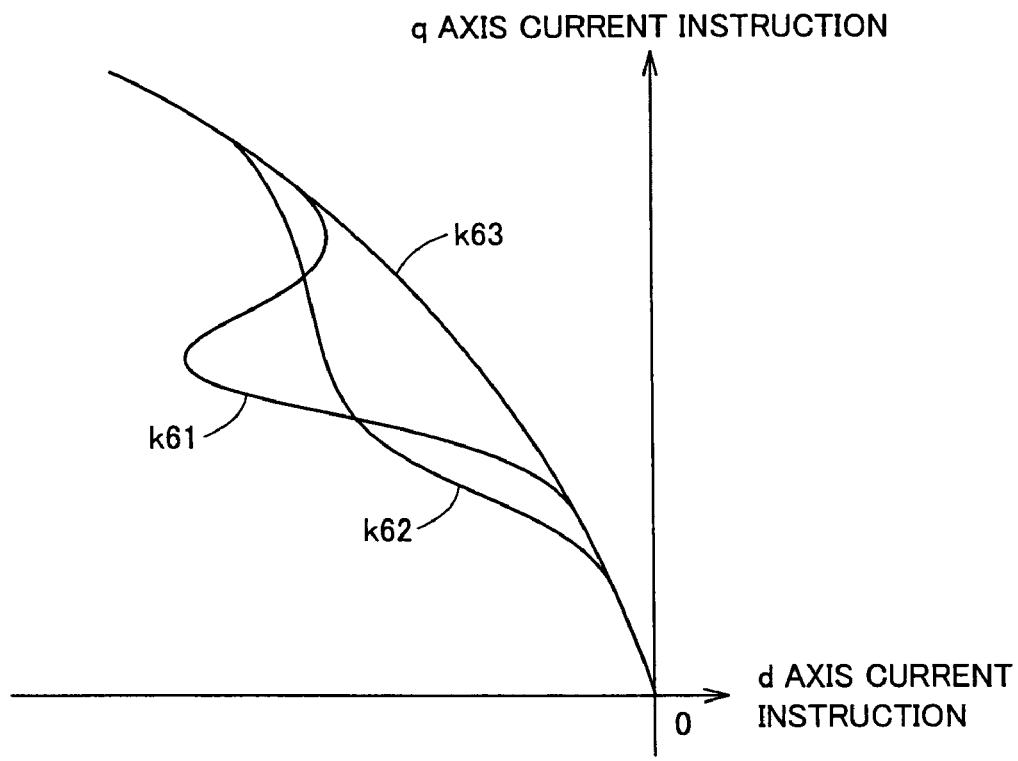
FIG. 14 illustrates a d-axis current instruction and a q-axis current instruction.

FIG. 14 illustrates d-axis current instruction Id* and q-axis current instruction Iq*. Referring to FIG. 14, a curve k61 represents d-axis current instruction Id* and q-axis current instruction Iq* in low-noise control in the first embodiment, and a curve k62 represents d-axis current instruction Id* and q-axis current instruction Iq* in the second variation of the present second embodiment. In addition, a curve k63 represents d-axis current instruction Id* and q-axis current instruction Iq* in maximum torque control.

As described above, according to the second variation of the present second embodiment, as AC motor M1 is controlled by using d-axis current instruction Id* and q-axis current instruction Iq* generated such that the motor voltage monotonously increases with the increase in torque instruction TR, with the motor voltage in low-noise control still serving as the basis, unstable control of AC motor M1 due to frequent switching between the control modes (the PWM control mode, the overmodulation control mode, and the rectangular wave control mode) of AC motor M1 can be avoided.

Third Embodiment

Figure 15:
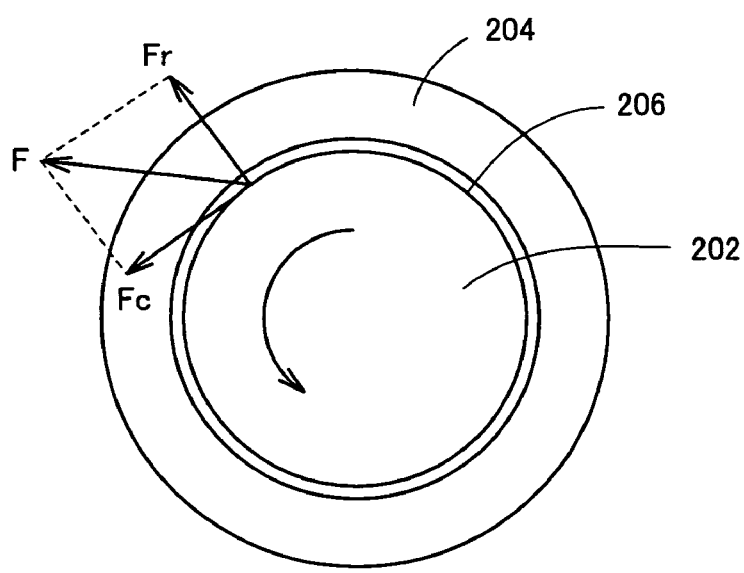
FIG. 15 is a cross-sectional view of an AC motor, schematically showing a cross-section perpendicular to a rotation axis of the motor.

FIG. 15 is a cross-sectional view of AC motor M1, schematically showing a cross-section perpendicular to a rotation axis of the motor. Referring to FIG. 15, a gap 206 is provided between a rotor 202 and a stator 204 of AC motor M1, and magnetic force F (magnetic attraction force or magnetic repulsion force) acts between rotor 202 and stator 204.

As described above, the vibration quantity of AC motor M1 is significantly dependent on magnetic force F. Here, magnetic force F that acts between rotor 202 and stator 204 can be divided into a rotation direction component Fc generating torque and a radial direction component Fr acting perpendicularly to the rotation axis. Here, fluctuation in radial direction component Fr considerably affects the vibration of AC motor M1.

Figure 16:
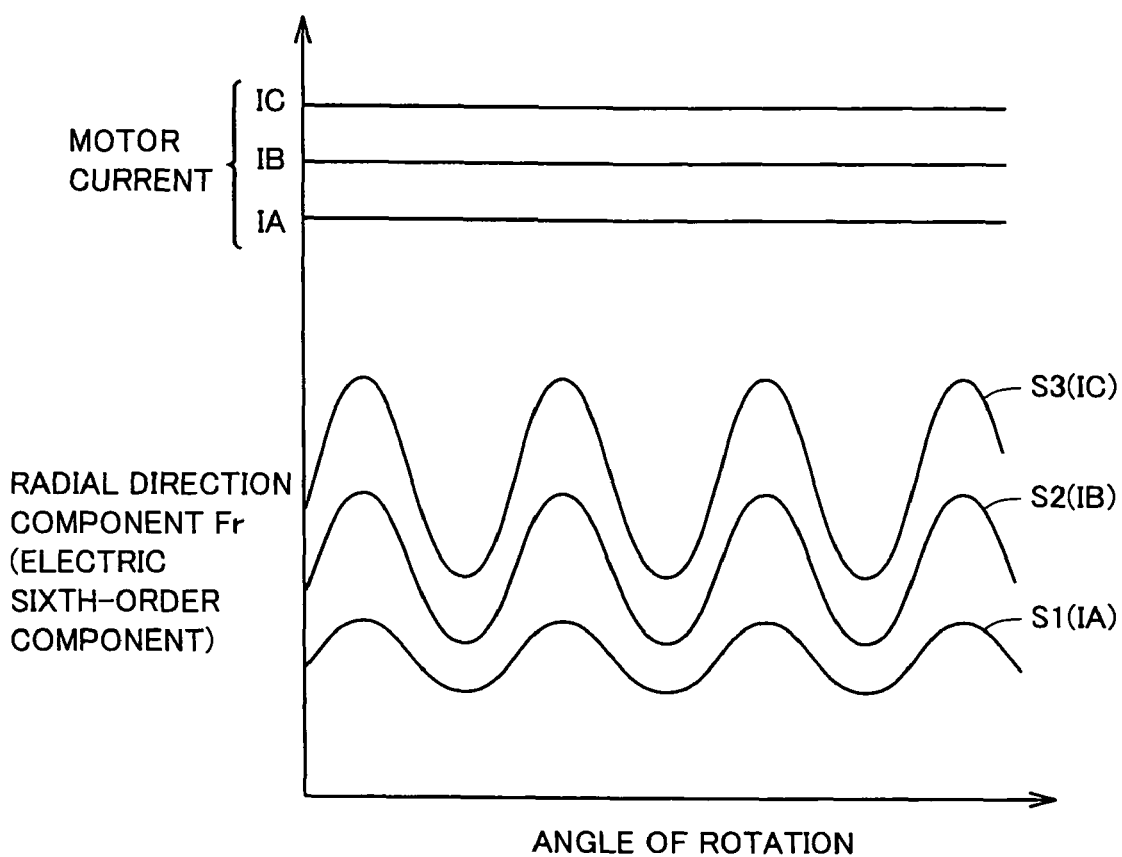
FIG. 16 illustrates a manner of fluctuation in a radial direction component (electric sixth-order component) of magnetic force.

FIG. 16 illustrates a manner of fluctuation of radial direction component Fr (electric sixth-order component) of magnetic force F. Referring to FIG. 16, the abscissa represents an angle of rotation of the rotor of AC motor M1, and curves S1 to S3 represent electric sixth-order components of radial direction components Fr of magnetic force F when motor currents IA to IC (IA<IB<IC) are supplied to AC motor M1, respectively.

As shown in the drawing, radial direction component Fr of magnetic force F periodically fluctuates depending on the angle of rotation of the rotor but regardless of magnitude of the motor current, in accordance with relative positional relation between the rotor and the stator that is structurally determined.

In the present third embodiment, the current instruction is corrected in order to suppress fluctuation in radial direction component Fr of magnetic force F that acts between the rotor and the stator of AC motor M1.

Figure 17:
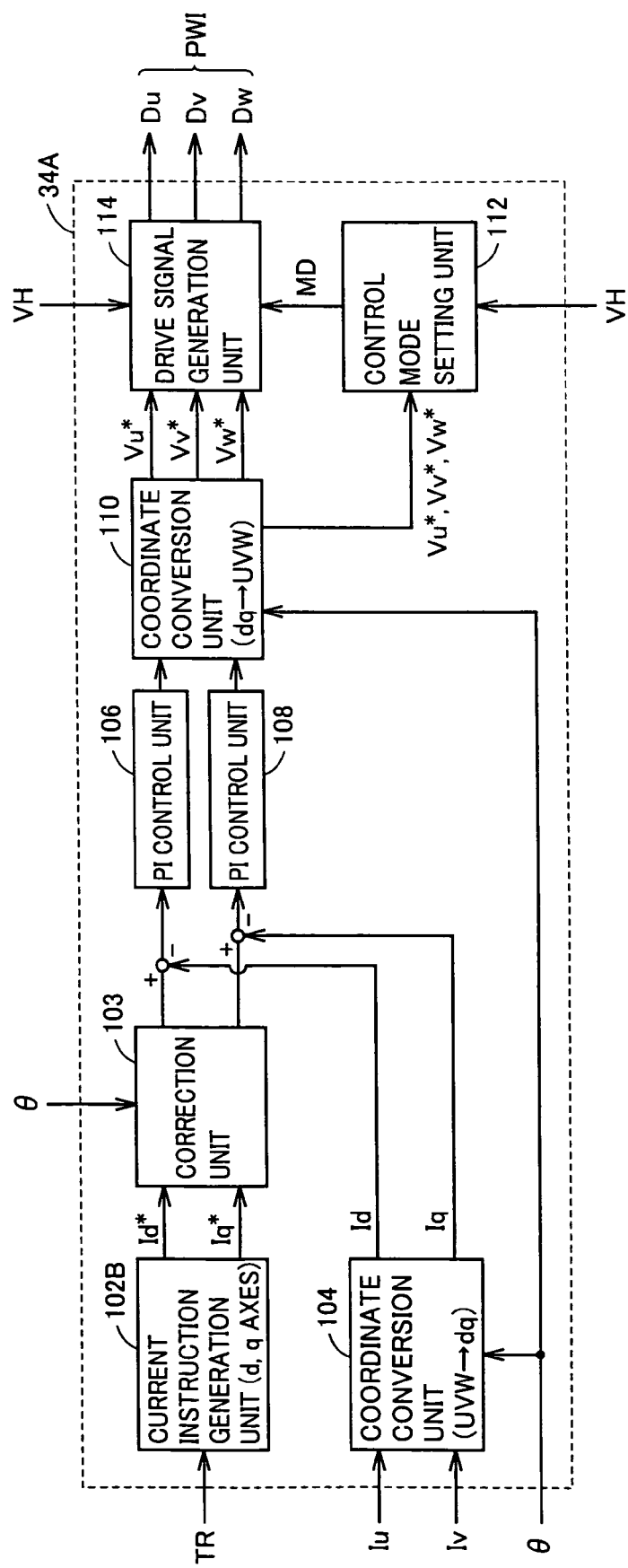
FIG. 17 is a detailed functional block diagram of an inverter control unit in a third embodiment.

FIG. 17 is a detailed functional block diagram of an inverter control unit in the third embodiment. Referring to FIG. 17, an inverter control unit 34A includes a current instruction generation unit 102B instead of current instruction generation unit 102 and further includes a correction unit 103, in the configuration of inverter control unit 34 in the first embodiment shown in FIG. 3.

Current instruction generation unit 102B generates d-axis current instruction Id* and q-axis current instruction Iq* satisfying a prescribed condition, based on torque instruction TR. For example, current instruction generation unit 102B can generate d-axis current instruction Id* and q-axis current instruction Iq* based on known maximum torque control.

Correction unit 103 receives d-axis current instruction Id* and q-axis current instruction Iq* from current instruction generation unit 102B and receives rotation angle θ of AC motor M1 from not-shown rotation angle sensor 48. Then, correction unit 103 corrects d-axis current instruction Id* and q-axis current instruction Iq* in accordance with rotation angle θ of AC motor M1 so as to suppress the electric sixth-order component in fluctuation in radial direction component Fr of magnetic force F.

More specifically, correction unit 103 corrects d-axis current instruction Id* and q-axis current instruction Iq* such that the motor current decreases in the vicinity of a relative maximum point of radial direction component Fr of magnetic force F, and corrects d-axis current instruction Id* and q-axis current instruction Iq* such that the motor current increases in the vicinity of a relative minimum point of radial direction component Fr of magnetic force F.

It is noted that correction unit 103 can correct d-axis current instruction Id* and q-axis current instruction Iq* based on rotation angle θ from rotation angle sensor 48, for example, by using a correction map in which a current correction amount is determined in advance in accordance with an angle of rotation of the rotor of AC motor M1.

It is noted that the configuration of inverter control unit 34A is otherwise the same as that of inverter control unit 34 in the first embodiment.

Figure 18:
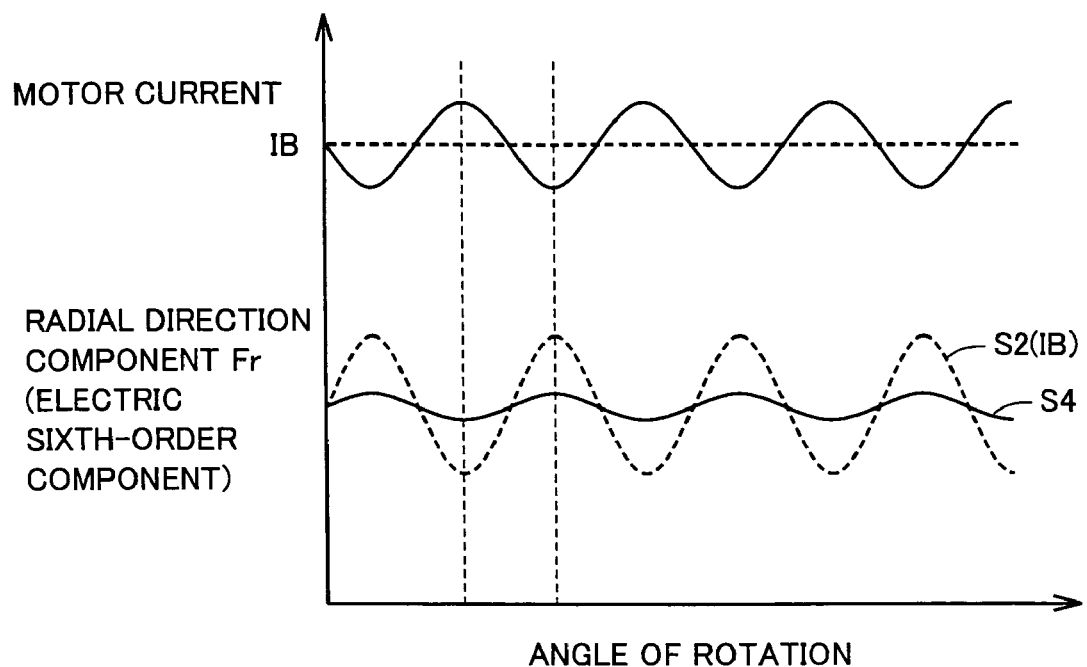
FIG. 18 illustrates relation between a motor current and a radial direction component (electric sixth-order component) of magnetic force.

FIG. 18 illustrates relation between a motor current and radial direction component Fr (electric sixth-order component) of magnetic force F. Referring to FIG. 18, curve S2 shown with a dotted line corresponds to curve S2 shown in FIG. 16, and a curve S4 represents an electric sixth-order component of radial direction component Fr of magnetic force F in an example where correction unit 103 corrects the current instruction.

As a result of correction of the current instruction by correction unit 103, the motor current decreases in the vicinity of the relative maximum point of radial direction component Fr of magnetic force F, and the motor current increases in the vicinity of the relative minimum point of radial direction component Fr. Thus, as compared with an example where correction is not made (curve S2), fluctuation in radial direction component Fr of magnetic force F is suppressed (curve S4).

In the description above, as AC motor M1 is implemented by the three-phase motor, the current instruction is corrected so as to suppress fluctuation in the electric sixth-order component dominant in fluctuation in radial direction component Fr, however, correction of the current instruction is not limited to correction for suppressing only electric sixth-order component fluctuation.

Figure 19:
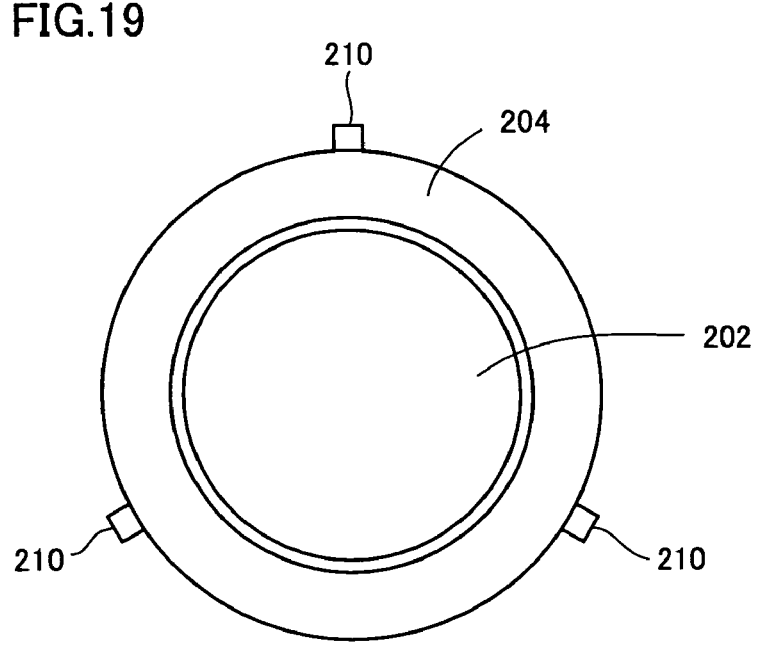
FIG. 19 illustrates arrangement of an acceleration sensor.

In addition, in the description above, though the current instruction is corrected based on rotation angle θ of AC motor M1 by using the correction map in which the current correction amount is determined in advance in accordance with the angle of rotation of the rotor in AC motor M1, fluctuation in radial direction component Fr of magnetic force F may be detected with an acceleration sensor 210 securely provided on stator 204 or a motor case (not shown) where AC motor M1 is stored as shown in FIG. 19, so that correction unit 103 may correct the current instruction using the detection value.

As described above, according to the present third embodiment, as the current instruction is corrected so as to suppress fluctuation in radial direction component Fr of magnetic force F, quietness of AC motor M1 can effectively be improved. In addition, increase in size and weight of AC motor M1 brought about by measures against vibration or sound noise supported by hardware is not likely.

In addition, as the current instruction is generated with a known current control method and correction unit 103 corrects the generated current instruction, quietness of AC motor M1 can be improved while also achieving an effect obtained by the known current control method.

In the description above, AC motor M1 corresponds to the "motor" in the present invention, and PI control units 106 and 108, coordinate conversion unit 110, control mode setting unit 112, and drive signal generation unit 114 in inverter control unit 34, 34A form the "control unit" in the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A motor control device, comprising:
   a current instruction generation unit generating a current instruction based on a torque instruction for a motor;
   a current detection unit detecting a current that flows in the motor; and
   a control unit controlling the motor based on a difference between the current instruction and the current detected by the current detection unit;
   the current instruction generation unit generating, based on the torque instruction, a current instruction having a current phase determined in advance for each torque of the motor so as to suppress vibration of the motor, wherein
   the current instruction generation unit generates the current instruction so as to restrict variation in a d-axis current with respect to variation in the torque instruction, and
   the current instruction generation unit generates the current instruction such that the d-axis current monotonously decreases with increase in the torque instruction.

2. The motor control device according to claim 1, wherein the current instruction generation unit generates the current instruction so as to lower vibration of the motor, as compared with a case where the motor is controlled based on a current instruction having an optimal current phase determined so as to satisfy a prescribed condition.

3. The motor control device according to claim 1, wherein the current instruction generation unit generates the current instruction based on the torque instruction, using a current map in which a current phase is determined in advance for each torque of the motor.

4. The motor control device according to claim 1, wherein the motor includes a permanent magnet three-phase AC synchronous motor, and
   the current instruction generation unit generates the current instruction so as to suppress a vibration component corresponding to a sixth-order component of a current frequency of the motor.

5. A motor control device, comprising:
   a current instruction generation unit generating a current instruction based on a torque instruction for a motor;
   a current detection unit detecting a current that flows in the motor; and
   a control unit controlling the motor based on a difference between the current instruction and the current detected by the current detection unit;
   the current instruction generation unit generating, based on the torque instruction, a current instruction having a current phase determined in advance for each torque of the motor so as to suppress vibration of the motor, wherein
   the current instruction generation unit generates the current instruction so as to restrict variation in a q-axis current with respect to variation in the torque instruction, and
   the current instruction generation unit generates the current instruction such that the q-axis current monotonously increases with increase in the torque instruction.

6. The motor control device according to claim 5, wherein the current instruction generation unit generates the current instruction so as to lower vibration of the motor, as compared with a case where the motor is controlled based on a current instruction having an optimal current phase determined so as to satisfy a prescribed condition.

7. The motor control device according to claim 5, wherein the current instruction generation unit generates the current instruction based on the torque instruction, using a current map in which a current phase is determined in advance for each torque of the motor.

8. The motor control device according to claim 5, wherein the motor includes a permanent magnet three-phase AC synchronous motor, and
   the current instruction generation unit generates the current instruction so as to suppress a vibration component corresponding to a sixth-order component of a current frequency of the motor.

9. A motor control device, comprising:
   a current instruction generation unit generating a current instruction based on a torque instruction for a motor;
   a current detection unit detecting a current that flows in the motor; and
   a control unit controlling the motor based on a difference between the current instruction and the current detected by the current detection unit;
   the current instruction generation unit generating, based on the torque instruction, a current instruction having a current phase determined in advance for each torque of the motor so as to suppress vibration of the motor, wherein
   the current instruction generation unit generates the current instruction so as to restrict variation in a control voltage of the motor with respect to variation in the torque instruction, and
   the current instruction generation unit generates the current instruction such that the control voltage monotonously increases with increase in the torque instruction.

10. The motor control device according to claim 9, wherein the current instruction generation unit generates the current instruction so as to lower vibration of the motor, as compared with a case where the motor is controlled based on a current instruction having an optimal current phase determined so as to satisfy a prescribed condition.

11. The motor control device according to claim 9, wherein the current instruction generation unit generates the current instruction based on the torque instruction, using a current map in which a current phase is determined in advance for each torque of the motor.

12. The motor control device according to claim 9, wherein the motor includes a permanent magnet three-phase AC synchronous motor, and
   the current instruction generation unit generates the current instruction so as to suppress a vibration component corresponding to a sixth-order component of a current frequency of the motor.

13. A vehicle, comprising:
a motor generating driving force for running the vehicle; and
a motor control device controlling the motor;
the motor control device including:
- a current instruction generation unit generating a current instruction based on a torque instruction for the motor;
- a current detection unit detecting a current that flows in the motor; and
- a control unit controlling the motor based on a difference between the current instruction and the current detected by the current detection unit;
- the current instruction generation unit generating, based on the torque instruction, a current instruction having a current phase determined in advance for each torque of the motor so as to suppress vibration of the motor, wherein
- the current instruction generation unit generates the current instruction so as to restrict variation in a d-axis current with respect to variation in the torque instruction, and
- the current instruction generation unit generates the current instruction such that the d-axis current monotonously decreases with increase in the torque instruction.

14. A vehicle, comprising:
a motor generating driving force for running the vehicle; and
a motor control device controlling the motor;
the motor control device including:
- a current instruction generation unit generating a current instruction based on a torque instruction for the motor;
- a current detection unit detecting a current that flows in the motor; and
- a control unit controlling the motor based on a difference between the current instruction and the current detected by the current detection unit;
- the current instruction generation unit generating, based on the torque instruction, a current instruction having a current phase determined in advance for each torque of the motor so as to suppress vibration of the motor, wherein
- the current instruction generation unit generates the current instruction so as to restrict variation in a q-axis current with respect to variation in the torque instruction, and
- the current instruction generation unit generates the current instruction such that the q-axis current monotonously increases with increase in the torque instruction.

15. A vehicle, comprising:
a motor generating driving force for running the vehicle; and
a motor control device controlling the motor;
the motor control device including:
- a current instruction generation unit generating a current instruction based on a torque instruction for the motor;
- a current detection unit detecting a current that flows in the motor; and
- a control unit controlling the motor based on a difference between the current instruction and the current detected by the current detection unit;
- the current instruction generation unit generating, based on the torque instruction, a current instruction having a current phase determined in advance for each torque of the motor so as to suppress vibration of the motor, wherein
- the current instruction generation unit generates the current instruction so as to restrict variation in a control voltage of the motor with respect to variation in the torque instruction, and
- the current instruction generation unit generates the current instruction such that the control voltage monotonously increases with increase in the torque instruction.

* * * * *